US008408299B2

(12) United States Patent
Kaminsky et al.

(10) Patent No.: US 8,408,299 B2
(45) Date of Patent: Apr. 2, 2013

(54) VISCOUS OIL RECOVERY USING EMULSIONS

(75) Inventors: Robert D. Kaminsky, Houston, TX (US); Ramesh Varadaraj, Flemington, NJ (US)

(73) Assignee: ExxonMobil Upstream Research Company, Houston, TX (US)

( * ) Notice: Subject to any disclaimer, the term of this patent is extended or adjusted under 35 U.S.C. 154(b) by 275 days.

(21) Appl. No.: 12/919,700

(22) PCT Filed: Feb. 11, 2009

(86) PCT No.: PCT/US2009/033812
§ 371 (c)(1),
(2), (4) Date: Aug. 26, 2010

(87) PCT Pub. No.: WO2009/117191
PCT Pub. Date: Sep. 24, 2009

(65) Prior Publication Data
US 2010/0326662 A1    Dec. 30, 2010

Related U.S. Application Data

(60) Provisional application No. 61/070,156, filed on Mar. 20, 2008.

(51) Int. Cl.
*E21B 43/20* (2006.01)
*E21B 43/22* (2006.01)
*C09K 8/58* (2006.01)
*C09K 8/594* (2006.01)

(52) U.S. Cl. ..... 166/270; 166/266; 166/275; 166/305.1; 507/203; 507/904; 507/937

(58) Field of Classification Search ............... 166/225.1, 166/266, 268, 270, 275, 305.1, 252.1; 507/203, 507/232, 904, 937
See application file for complete search history.

(56) References Cited

U.S. PATENT DOCUMENTS

| 3,149,669 | A | 9/1964 | Binder et al. |
| 3,416,320 | A | 12/1968 | Asher |
| 3,811,501 | A | 5/1974 | Burnett et al. |
| 4,136,738 | A | 1/1979 | Haynes, Jr. et al. |
| 4,299,286 | A | 11/1981 | Alston |
| 4,418,753 | A | 12/1983 | Morel et al. |
| 4,478,280 | A | 10/1984 | Hopkins et al. |
| 4,908,154 | A | 3/1990 | Cook et al. |
| 5,065,821 | A | 11/1991 | Huang et al. |

(Continued)

FOREIGN PATENT DOCUMENTS

| EP | 1338330 | 8/2003 |
| WO | WO 2004/030788 | 4/2004 |

OTHER PUBLICATIONS

Claesson, Per M., et al., Surface Forces and Emulsion Stability, 2001, Encyclopedic Handbook of Emulsion Technology, CRC Press, Ch. 13, pp. 305.

(Continued)

*Primary Examiner* — George Suchfield
(74) *Attorney, Agent, or Firm* — ExxonMobil Upstream Research Company Law Department (57) ABSTRACT

The present invention is directed to a method of generating a basic water-in-oil emulsion for use in recovering hydrocarbons from a subterranean formation. The emulsion may be used to displace hydrocarbons from the formation. The emulsions used are 'basic' in the sense that they do not have added surfactants and are not solid-stabilized. The emulsions are made using a hydrocarbon having at least one of the following properties: (i) greater than five weight percent (wt %) asphaltene content, (ii) greater than two wt % sulfur content, and (iii) less than 22 dyne/cm interfacial tension between the hydrocarbon liquid and the aqueous liquid.

29 Claims, 9 Drawing Sheets

U.S. PATENT DOCUMENTS

| | | | |
|---|---|---|---|
| 5,104,516 | A | 4/1992 | De Bruijn et al. |
| 5,322,617 | A | 6/1994 | De Bruijn et al. |
| 5,607,016 | A | 3/1997 | Butler |
| 5,855,243 | A | 1/1999 | Bragg |
| 5,910,467 | A | 6/1999 | Bragg |
| 5,927,404 | A | 7/1999 | Bragg |
| 6,068,054 | A | 5/2000 | Bragg |
| 6,734,144 | B2 | 5/2004 | Varadaraj et al. |
| 6,951,891 | B2 | 10/2005 | Baltussen et al. |
| 7,186,673 | B2 | 3/2007 | Varadaraj et al. |
| 7,338,924 | B2 | 3/2008 | Varadaraj |
| 2001/0049902 | A1 | 12/2001 | Varadaraj et al. |
| 2004/0014821 | A1 | 1/2004 | Varadaraj |

OTHER PUBLICATIONS

M. Fiori, et al., Optimal Emulsion Design for the Recovery of a Saskatchewan Crude, Mar.-Apr. 1991, Journal of Canadian Petroleum Technology, 30(2), pp. 123-132.

H. Mendoza, et al., Effect of Injection Rate on Emulsion Flooding for a Canadian and a Venezuelan Crude Oil, 1991 Technical Conference (Banff Alberta), Petroleum Society of CIM and AOSTRA, Paper 91-26.

Toshimitsu Suzuki, et al., Chemical Structure of Tar-Sand Bitumens by $^{13}C$ and $^{1}H$ N.M.R. Spectroscopic Methods, May 1982, FUEL, vol. 61, pp. 402-410.

VISCOUS OIL RECOVERY USING EMULSIONS

CROSS-REFERENCE TO RELATED APPLICATION

This application is the National Stage of International Application No. PCT/US2009/033812, filed 11 Feb. 2009, which claims the benefit of U.S. Provisional Application No. 61/070,156, filed Mar. 20, 2008.

Co-pending application entitled "Enhancing Emulsion Stability," and claiming priority to U.S. Provisional Application No. 61/070,133 filed on Mar. 20, 2008 shares a priority date, an inventor, is assigned to the same entity, and may include subject matter related to the present application.

BACKGROUND

This section is intended to introduce various aspects of the art, which may be associated with exemplary embodiments of the present invention. This discussion is believed to assist in providing a framework to facilitate a better understanding of particular aspects of the present invention. Accordingly, it should be understood that this section should be read in this light, and not necessarily as admissions of prior art.

The present invention relates to a water-in-oil emulsion for use in recovering hydrocarbons from a subterranean formation. The emulsion may be used to displace hydrocarbons from the formation. The emulsions used are "basic" in the sense that they do not have added surfactants and are not solid stabilized.

Oil recovery is usually inefficient in subterranean formations (hereafter simply referred to as formations) where the mobility of the in situ oil being recovered is significantly less than that of the drive fluid used to displace the oil. Mobility of a fluid phase in a formation is defined by the ratio of the fluid's relative permeability to its viscosity. For example, when waterflooding is applied to displace very viscous heavy oil from a formation, the process is very inefficient because the oil mobility is much less than the water mobility. The water quickly channels through the formation to the producing well, bypassing most of the oil and leaving it unrecovered. Consequently, there is a need to either make the water more viscous, or use another drive fluid that will not channel through the oil. Because of the large volumes of drive fluid needed, it must be inexpensive and stable under formation flow conditions. Oil displacement is most efficient when the mobility of the drive fluid is significantly less than the mobility of the oil, so the greatest need is for a method of generating a low-mobility drive fluid in a cost-effective manner.

For modestly viscous oils—those having viscosities of approximately 10-300 centipoise (cp)—water-soluble polymers such as polyacrylamides or xanthan gum have been used to increase the viscosity of the water injected to displace oil from the formation. With this process, the polymer is dissolved in the water, increasing its viscosity. While water-soluble polymers can be used to achieve a favorable mobility waterflood for low to modestly viscous oils, usually the process cannot economically be applied to achieving a favorable mobility displacement of more viscous oils—those having viscosities of approximately 300 cp or higher. These oils are so viscous that the amount of polymer needed to achieve a favorable mobility ratio would usually be uneconomic. Further, as known to those skilled in the art, polymer dissolved in water often is adsorbed from the drive water onto surfaces of the formation rock, entrapping it and rendering it ineffective for viscosifying the water. This leads to loss of mobility control, poor oil recovery, and high polymer costs. For these reasons, use of polymer floods to recover oils in excess of about 300 cp is not usually economically feasible. Also, performance of many polymers is adversely affected by levels of dissolved ions typically found in formation brine, placing limitations on their use and/or effectiveness.

Water-in-oil macroemulsions (hereafter referred to simply as "emulsions" or "w/o emulsions") have been proposed as a method for producing viscous drive fluids that can maintain effective mobility control while displacing moderately viscous oils. For example, the use of water-in-oil and oil-in-water macroemulsions have been evaluated as drive fluids to improve oil recovery of viscous oils. Although generally not discussed herein, microemulsions (i.e., thermodynamically stable emulsions) have also been proposed as flooding agents for hydrocarbon recovery from reservoirs, which may also be referred to as "emulsion flooding."

While emulsions are useful for a variety of applications, they are known to be thermodynamically unstable due to their large interfacial tension between the two substances (e.g., oil and water). It is highly desirable to stabilize the emulsions for use in displacement or other applications. In almost every case, stabilization has been accomplished using an added emulsifier. See CLAESSON, PER M., et al., Surface Forces and Emulsion Stability, Encyclopedic Handbook of Emulsion Technology, CRC Press, ch. 13, p. 305 (2001). Specific emulsifier additives and techniques are discussed in the following paragraphs.

Macroemulsions used for hydrocarbon recovery have been created by addition of sodium hydroxide to acidic crude oils from Canada and Venezuela. See, e.g., H. MENDOZA, S. THOMAS, and S. M. FAROUQ ALI, "Effect of Injection Rate on Emulsion Flooding for a Canadian and a Venezuelan Crude Oil", Petroleum Society of CIM and AOSTRA 1991 Technical Conference (Banff, Alberta), Paper 91-26; and M. FIORI and S. M. FAROUQ ALI, "Optimal emulsion design for the recovery of a Saskatchewan crude," Journal of Canadian Petroleum Technology, 30(2), 123-132, March-April 1991. These emulsions were stabilized by soap films created by saponification of acidic hydrocarbon components in the crude oil by sodium hydroxide. The soap films reduced the oil/water interfacial tension, acting as surfactants to stabilize the water-in-oil emulsion. It is well known, therefore, that the stability of such emulsions substantially depends on the use of caustic (e.g., sodium hydroxide) for producing a soap film to reduce the oil/water interfacial tension.

Various studies on the use of caustic for producing such emulsions have demonstrated technical feasibility. However, the practical application of this process for recovering oil has been limited by the high cost of the caustic, likely adsorption of the soap films onto the formation rock leading to gradual breakdown of the emulsion, and the sensitivity of the emulsion viscosity to minor changes in water salinity and water content. For example, because most formations contain water with many dissolved solids, emulsions requiring fresh or distilled water often fail to achieve design potential because such low-salinity conditions are difficult to achieve and maintain within the actual formation. Ionic species can be dissolved from the rock and the injected fresh water can mix with higher-salinity resident water, causing breakdown of the low-tension stabilized emulsion.

Bragg et al., (U.S. Pat. Nos. 5,855,243, 5,910,467, 5,927,404, 6,068,054) describe using a high water-cut water-in-oil emulsion stabilized with microparticles and diluted with dissolved gas to displace viscous oils from subterranean formations. As stated in '243, these so-called "solid stabilized emulsions" are such that "solid particles are the primary means, but not necessarily the only means, by which the films surrounding the internal phase droplets of an emulsion are maintained in a stable state under formation conditions for a sufficient time to use an emulsion as intended (e.g., enhance rate and/or amount of hydrocarbon production from a formation)."

Binder et al., (U.S. Pat. No. 3,149,669) describes generating emulsions and injecting the emulsions into a subterranean oil reservoir to displace the oil and improve recovery. The patent however teaches that addition of an emulsifier is preferred (see Col 3, lines 54-71; and the example given in Col 4, lines 43-51). In particular, '669 states (Col 3, 54-57): "An emulsifier is preferably used to stabilize the emulsion. The emulsifier will normally comprise between about 0.1 and about 4% of the weight of the emulsion." The present invention differs from the '669 patent in that the present invention identifies a method of selecting a hydrocarbon fluid with enumerated properties such that additives are not needed. Use of emulsifiers add cost and complexity to emulsion generation and injection into oil reservoirs and thus the present invention improves upon the '669 invention.

R. Varadaraj (U.S. Pat. No. 7,338,924) describes a method to utilize stable oil-in-water-in-oil (O/W/O) emulsions to displace oil from subterranean reservoirs. The '924 patent teaches adding an organic salt to the emulsion as the recommended approach. No method is taught or suggested for creating such stable emulsions without addition of a stabilizing agent.

The method of using a water-in-oil emulsion can be highly effective for certain oils and formations. The use of microparticles, typically clays or silica fines, however can be problematic in certain cases. In particular, for lower permeability formations the fines may lead to pore plugging, especially near the wellbore, and ultimately injectivity reduction. Additionally, the logistics of supplying microparticles to remote locations may lead to substantial costs. Thus there is a need to reduce or remove the presence of microparticles in certain emulsions.

Accordingly, there is a need for a method to produce an emulsion that can be made economically and is capable of performing under a wide range of formation conditions, including salinity, temperature, and permeability.

Other relevant information may be found in U.S. Pat. No. 3,811,501; U.S. Pat. No. 4,136,738; U.S. Pat. No. 4,299,286; U.S. Pat. No. 4,418,753; U.S. Pat. No. 4,478,280; U.S. Pat. No. 5,065,821 U.S. Pat. No. 5,104,516; U.S. Pat. No. 5,322,617; U.S. Pat. No. 5,607,016; and U.S. Provisional Patent Application No. 61/070,133 titled "Enhancing Emulsion Stability," filed on Mar. 20, 2008.

SUMMARY OF INVENTION

According to at least one aspect of the invention, a method for producing viscous hydrocarbons from a subterranean formation is provided. The method includes: a. selecting a hydrocarbon liquid and an aqueous liquid for generating an emulsion, wherein the hydrocarbon liquid has at least one of the following properties: (i) greater than about five weight percent (wt %) asphaltene content, (ii) greater than about two wt % sulfur content, and (iii) less than about 22 dyne/cm interfacial tension between the hydrocarbon liquid and the aqueous liquid; b. generating the emulsion having a continuous phase formed from the hydrocarbon liquid and an internal phase formed from the aqueous liquid, wherein the emulsion is a "basic" emulsion; c. injecting the basic emulsion into the subterranean formation for use as a drive fluid; and d. producing said viscous hydrocarbons from the formation using the basic emulsion. In some embodiments, the hydrocarbon liquid has at least two of the properties (i)-(iii) listed above, or the hydrocarbon liquid has all three of the properties (i)-(iii) listed above. In still another embodiment, the hydrocarbon liquid has each of the following properties: (i) greater than about eight weight percent (wt %) asphaltene content, and (ii) less than about 10 dyne/cm interfacial tension between the hydrocarbon liquid and the aqueous liquid, and the hydrocarbon liquid may be the viscous hydrocarbons produced from the formation.

In another aspect of the invention, a method of producing an emulsion is provided. The method includes selecting a hydrocarbon liquid and an aqueous liquid, wherein the hydrocarbon liquid has at least one of the following properties: (i) greater than about five weight percent (wt %) asphaltene content, (ii) greater than about two wt % sulfur content, and (iii) less than about 22 dyne/cm interfacial tension between the hydrocarbon liquid and the aqueous liquid; forming a basic emulsion from the hydrocarbon liquid and the aqueous liquid, wherein the hydrocarbon liquid is the continuous phase component of the basic emulsion and the aqueous liquid is the internal phase component; and improving the stability of the basic emulsion. Improving the stability of the basic emulsion includes: stressing the basic emulsion to rupture at least a portion of the internal phase component to produce a stressed emulsion and a broken-out portion of the internal phase component; and shearing the stressed emulsion with at least a portion of the broken-out portion of the internal phase component.

Another method of producing viscous hydrocarbons from a subterranean formation is provided. The method includes selecting a hydrocarbon liquid and an aqueous liquid, wherein the hydrocarbon liquid has at least one of the following properties: (i) greater than about five weight percent (wt %) asphaltene content, (ii) greater than about two wt % sulfur content, and (iii) less than about 22 dyne/cm interfacial tension between the hydrocarbon liquid and the aqueous liquid; forming a basic emulsion from the hydrocarbon liquid and the aqueous liquid, wherein the hydrocarbon liquid is the continuous phase component of the basic emulsion and the aqueous liquid is the internal phase component; and improving the stability of the basic emulsion. Improving the stability of the basic emulsion includes: stressing the basic emulsion to rupture at least a portion of the internal phase component to produce a stressed emulsion and a broken-out portion of the internal phase component; and shearing the stressed emulsion with at least a portion of the broken-out portion of the internal phase component; then injecting the basic emulsion into the subterranean formation for use as a drive fluid; and producing said viscous hydrocarbons from the formation using the basic emulsion.

BRIEF DESCRIPTION OF THE DRAWINGS

The foregoing and other advantages of the present invention may become apparent upon reviewing the following detailed description and drawings of non-limiting examples of embodiments in which.

DETAILED DESCRIPTION OF THE INVENTION

In the following detailed description section, the specific embodiments of the present invention are described in connection with preferred embodiments. However, to the extent that the following description is specific to a particular embodiment or a particular use of the present invention, this is intended to be for exemplary purposes only and simply provides a description of the exemplary embodiments. Accordingly, the invention is not limited to the specific embodiments described below, but rather, it includes all alternatives, modifications, and equivalents falling within the true spirit and scope of the appended claims.

"Emulsion stability" is the degree to which an emulsion retains its internal phase as droplets homogeneously distributed when the emulsion is stressed, for example by passing the emulsion through porous media, aging the emulsion, heating the emulsion, or contacting the emulsion with a fluid of differing salinity or pH. Emulsion stability may be measured in dynes per centimeter (dyne/cm), but may also be assessed more generally based on behavioral observation of the emulsion. For example, the emulsion stability of a water-in-oil emulsion designed to be used as a displacement fluid to recover hydrocarbons trapped in porous reservoir rock may be assessed by measuring the amount of water which breaks out as a free phase when the emulsion is passed through a core of similar porosity and permeability as the targeted reservoir rock at a velocity similar to in situ reservoir conditions. Other, more approximate assessment methods may also be used, such as stressing the emulsion in a centrifuge or an electric field.

An "artificially stabilized emulsion" is an emulsion in which a component (i.e., a stabilizing agent) has been added to the emulsion or constituent fluids by human intervention prior to, during, or after generation of the emulsion to more than nominally enhance the emulsion stability beyond its natural stability. The added component may be a surfactant, a reactive chemical that generates a surfactant, surface active particles, organic acids, or organic salts.

A "solid stabilized emulsion" is an emulsion where solid particles are the primary means, but not necessarily the only means, by which the films surrounding the internal phase droplets of an emulsion are maintained in a stable state for a sufficient time to use an emulsion as intended. The "stabilizing solids" can be artificially added or naturally occurring. One way to test the stabilizing effect of the solids is to test the emulsion stability of an emulsion generated with the solids and compare the results to another emulsion generated in a similar manner composed of fluids without the solids (such as by pre-filtering the component fluids through a 0.4 micron (or smaller) pore throat size filter or by not adding solids to the component fluids). If the emulsion stability is substantially the same with the solids and without the solids, then the solids are not "stabilizing solids."

A "solid" is a substance in its most highly concentrated form, i.e., the atoms or molecules comprising the substance are more closely packed with one another relative to the liquid or gaseous states of the substance either under formation or nonformation conditions, as defined in U.S. Pat. No. 5,855,243. Examples of "stabilizing solids" are particles including, without limitation, clays, quartz, feldspar, gypsum, metal sulfides, metal sulfates, metal oxides, coal dust, asphaltenes, or polymers. However, it is also important to note that some of these same substances may not be solids at formation conditions. In particular, the substances may be in a dissolved state within the oil at formation conditions. In such a state they are no longer considered solids because the molecules are no longer closely packed. As a specific example, asphaltenes may be classified as a solid when found in highly concentrated "clumps" at formation conditions. However, asphaltenes in a dissolved state are not considered a "solid" for the purpose of this disclosure.

A "basic emulsion" is an emulsion that is substantially free from stabilizing solids and substantially free of any added stabilizing agent or component such as those found in artificially stabilized emulsions. In the context used herein, the term "basic" does not have any implication as to the pH properties (i.e., acidity) of the emulsion fluids.

The present invention improves upon the application of emulsions for displacement of hydrocarbons for subterranean formations by selecting hydrocarbon fluids that form stable emulsions substantially without the presence of stabilizing agents or stabilizing solids.

The methods disclosed herein can be applied to generating emulsions to be used as drive fluids to displace oils too viscous to be recovered efficiently by waterflooding in non-thermal (aka "cold flow") or thermal applications. The emulsions are referred to herein as "basic emulsions." The emulsions used are "basic" (as defined herein) in the sense that they do not have added surfactants and are not solid stabilized. The emulsions used for practicing the invention are preferably generated above ground and injected as an emulsion.

The oil used for making the emulsion should naturally contain non-solid surface active components to stabilize the emulsion without need for added solids or surfactants. In this regard the oil should have at least one of the following properties: 1) greater than about five weight percent (wt %) n-heptane insoluble asphaltene content (as measured by ASTM Standard D6560), 2) greater than about 2 wt % atomic sulfur content, and 3) less than 22 dyne/cm interfacial tension between the hydrocarbon liquid and the aqueous liquid used to compose the emulsion. For clarity, some hydrocarbon liquids may include only one of the three listed properties, other hydrocarbon liquids may include only two of the properties, and still other hydrocarbon liquids may include all three of the listed properties.

For emulsions used to displace viscous hydrocarbons from a subterranean formation, the emulsion's oil is preferably comprised of hydrocarbons previously produced from the formation where the emulsion is to be used. The emulsions disclosed herein are preferably used to recover moderately viscous or heavy oils (e.g., about 20 centipose (cp) to about 3,000 cp).

The water used for making the emulsion should have sufficient ion concentration (greater than at least 1,000 parts per million (ppm) salt concentration on a mass basis) to keep the emulsion stable under formation conditions. Preferably, formation brine is used to make the emulsion. However, fresh water could be used and the ion concentration adjusted. One method of adjusting the ion concentration is to add salts, including higher valence salts (e.g., calcium, magnesium, or aluminum) to the aqueous solution as needed for stabilizing the emulsion under formation conditions. The ionization of the aqueous solution may also be adjusted by changing the ratio of mono- to di-valent or tri-valent ion concentration. The ion concentration and ratio may be tailored to and dependent on the properties of the hydrocarbon liquid selected.

Figure 1:
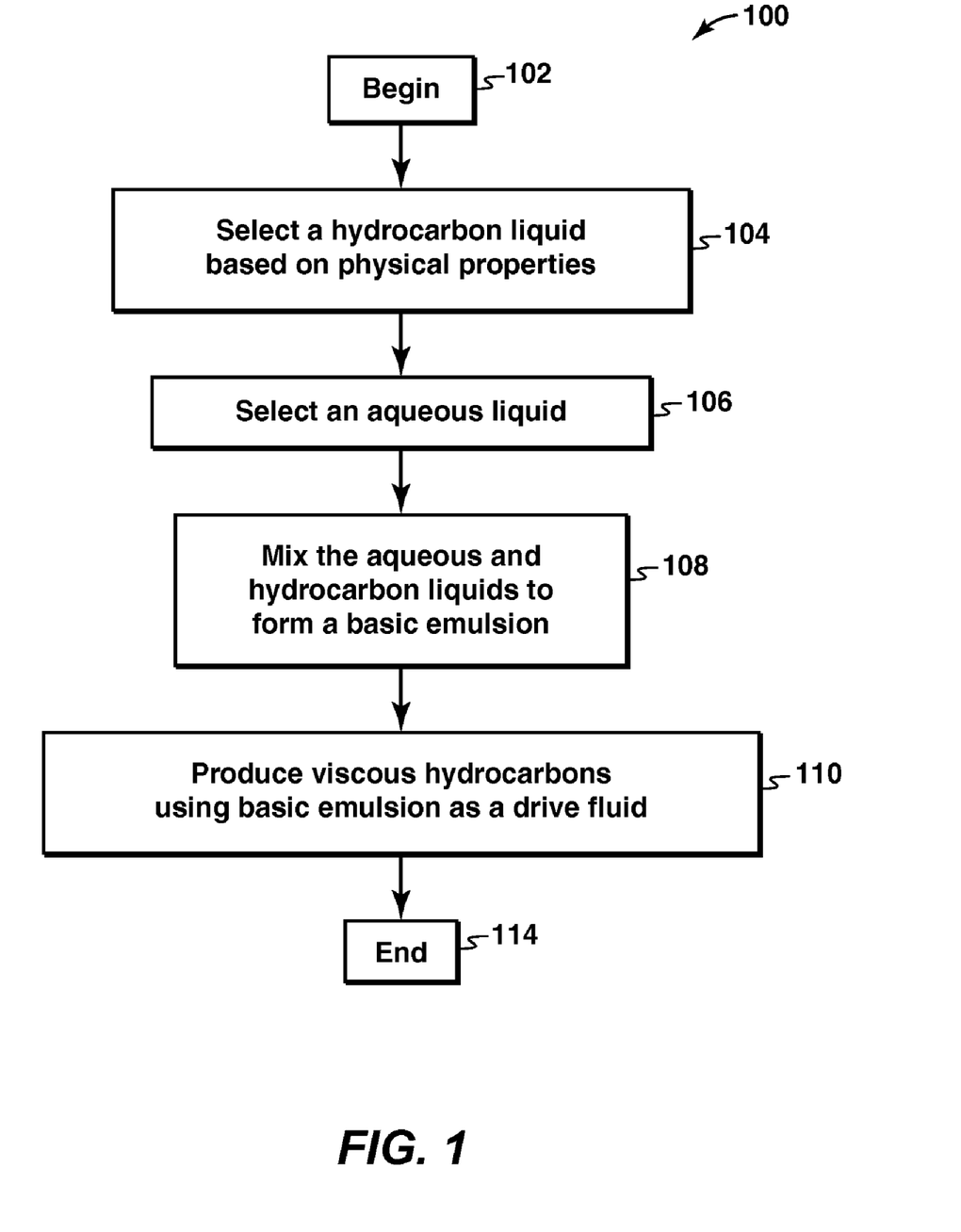
FIG. 1 is a flow chart of a method of producing viscous hydrocarbons utilizing a basic emulsion.

Referring now to the figures, FIG. 1 is a flow chart of a method of producing viscous hydrocarbons utilizing a basic emulsion. The process 100 begins at block 102, then comes selecting a hydrocarbon liquid 104 and selecting an aqueous liquid 106. The hydrocarbon liquid is selected 104 based on whether it has one, two, or three of the following properties: 1) greater than about five weight percent (wt %) n-heptane insoluble asphaltene content (as measured by ASTM Standard D6560), 2) greater than about 2 wt % atomic sulfur content, and 3) less than 22 dyne/cm interfacial tension between the hydrocarbon liquid and the aqueous liquid. Then, the hydrocarbon liquid and the aqueous liquid are mixed 108 to form a basic emulsion. Once the emulsion is properly mixed 108, it is injected into the formation and used as a drive fluid to produce the viscous hydrocarbon 110 out of the formation. The process 100 ends at block 112.

The mixing step 108 may be carried out by a variety of means and methods, for example, shearing by means of a rotating blade, flow between rotating cylinders (e.g., a colloid mill), or flow through small holes. In any event, the objective is to blend the oil with water and subject the blend to sufficient shearing/mixing energy to produce water droplets sufficiently small to remain dispersed and stabilized in the oil. No solid particles or surfactants are added to the mixture. Preferably, the water-in-oil emulsion is composed of less than 50 volume percent (vol %) of the selected hydrocarbon liquid and greater than 50 vol % of the aqueous liquid. Moreover, preferably greater than 90 vol % of the droplets have diameters less than 20 microns.

The shearing may be a staged, continuous series of mixers, a single mixer, or a recycle mixing system, which may optionally include a stressing unit. Systems having a stressing unit are disclosed in U.S. Provisional Patent Application No. 61/070,133 titled "Enhancing Emulsion Stability," filed on Mar. 20, 2008, which is hereby incorporated by reference. One example of a method of generating a basic emulsion according to the present disclosure comprises forming an emulsion, then improving the emulsion's stability. Improving the emulsion stability includes stressing the emulsion to rupture at least a portion of the internal phase component to generate a "stressed emulsion" which is a mixture of surviving emulsion and broken-out internal phase fluid. After stressing the emulsion, reshearing the surviving emulsion with at least a portion of the broken-out internal phase fluid.

In addition, the order and manner of mixing can have great effect on the properties of the resulting emulsion. For example, high-water-content oil-external emulsions are best produced by adding the water to the oil rather than adding oil to water. Water can be added to the oil to increase its concentration in small increments, with continuous shearing, until the total desired water content is reached.

Figure 2:
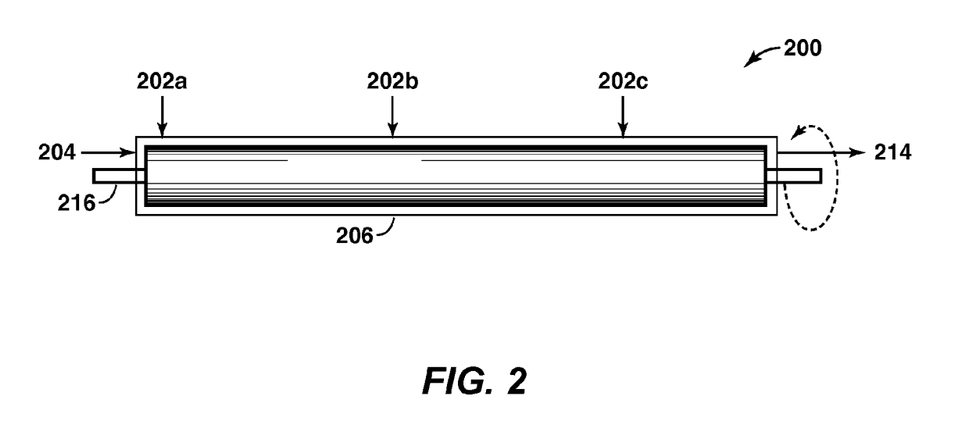
FIG. 2 illustrates an exemplary emulsion mixing system.

FIG. 2 illustrates an exemplary emulsion mixing system. The apparatus 200 includes a mixing unit 206, which includes at least one aqueous fluid inlet 202a, 202b, 202c and a hydrocarbon fluid inlet 204. After mixing, the mixed emulsion then exits the emulsion outlet 214. The mixer 206 may comprise flow through narrow gaps adjacent to rotating surfaces (e.g., colloid mills) supported by a rotating shaft 216, bladed stirrers, high-pressure nozzles (e.g., homogenizers), or other similar device. The apparatus 200 may include multiple mixers 206 in series (not shown) or a single, continuous mixer 206 having multiple stages of emulsion generation where water is added at more than one stage 202a, 202b, 202c. In some embodiments, the emulsion may be generated in a staged continuous mixer 206 where less than 60% of the total aqueous liquid volume is added in any one stage. In other embodiments, the emulsion may be generated in a staged continuous mixer 206 where less than 40% of the total aqueous liquid volume is added in any one stage.

Figure 3A:
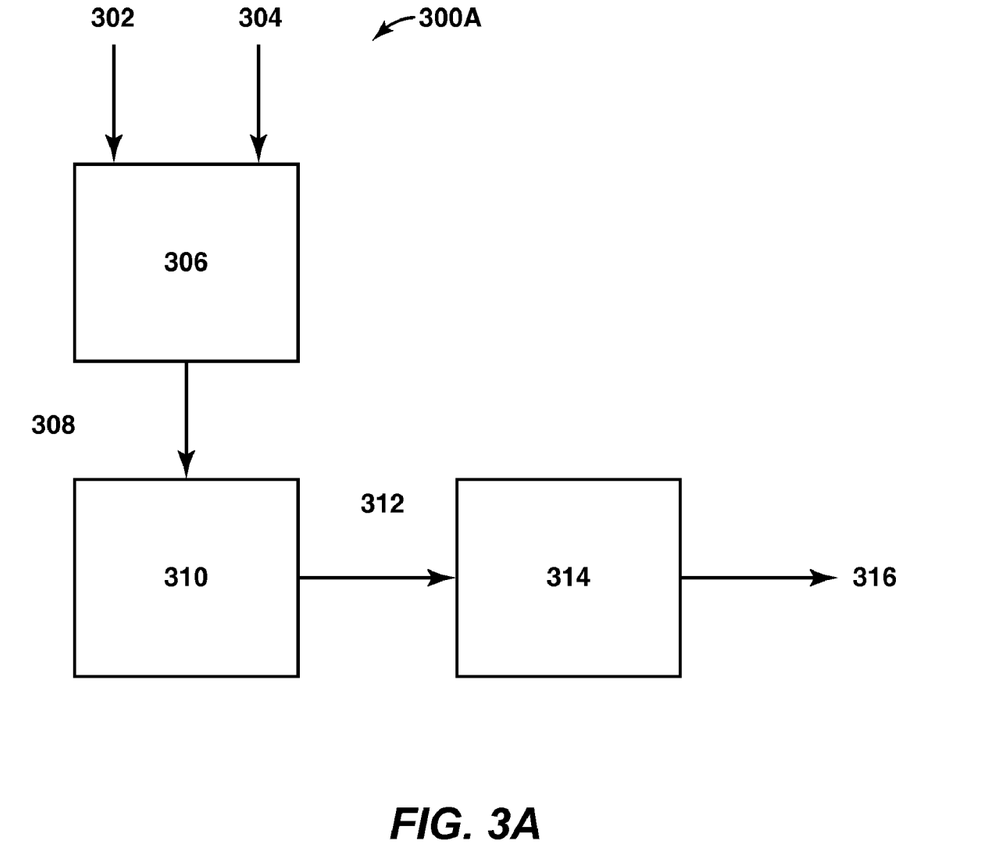
FIGS. 3A-3E are illustrative diagrams of some alternatives to the emulsion mixing apparatus of FIG. 2.

FIGS. 3A-3E are illustrative diagrams of some alternatives to the emulsion mixing apparatus of FIG. 2 and include one or more stressing steps to improve the final emulsion stability. As such, FIGS. 3A-3E may be best understood with reference to FIG. 2. In FIG. 3A the apparatus 300A includes a mixer 306 for forming an emulsion by mixing 108 an aqueous fluid 302 and a hydrocarbon fluid 304. The mixer 306 further includes an emulsion outlet 308 for delivering the resulting emulsion from the mixer 306 to a stressing unit 310 configured to generate a stressed emulsion. The stressing unit 310 has a stressed emulsion outlet 312 for delivering the stressed emulsion to a remixing unit 314, which shears the stressed emulsion to produce a stabilized emulsion via a stabilized emulsion outlet 316.

The stressing unit 310 is any unit or device that causes at least a portion of the mixed emulsion to "break out." The stressing unit 310 may be, for example, an aging unit, a heating unit, or a filtering unit. In the case of a filtering unit, the filter may be a microfilter, which may comprise sand, sintered metal, porous rock, or any other filtering medium. Such a filter may have an average pore throat size of less than about 20 microns, less than about 10 microns, or less than about 5 microns. While FIG. 3A depicts the remixing unit 314 as separate from the mixer 306, it may be the same unit in some embodiments. In one alternative embodiment, a portion of the stressed emulsion outlet 312 may feed to a separate reshearing (e.g., remixing) unit 314, with the remaining portion of the stressed emulsion is recycled to the original mixing unit 306.

Figure 3B:
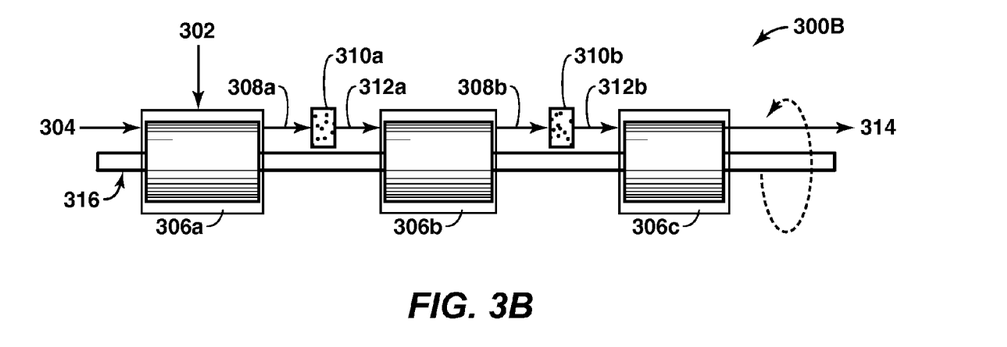

FIG. 3B is an exemplary embodiment of the apparatus 300A. The apparatus 300B comprises an aqueous inlet stream 302 and an oil inlet stream 304 into a first mixing unit 306a to form an emulsion 108. The first exit stream 308a carries the emulsion from the first mixing unit 306a to a first filter unit 310a to stress the emulsion to generate a first stressed emulsion stream 312a. The first stressed emulsion stream 312a is fed into the second mixing unit 306b to shear the stressed emulsion, producing a second exit stream 308b into the second filter unit 310b. From the second filter unit 310b, a second stressed emulsion stream 312b is produced and sent to a third mixing unit 306c, which produces a final emulsion product stream 314.

In this particular embodiment of the apparatus 300A, all of the water 302 is injected in the first mixing unit 306 and the three mixing units 306a-306c are colloid mills with cylinders connected to a rotating shaft 316. The cylinders are housed in drums sized to have narrow gaps between the inside of the drum and the rotating cylinder. Although colloid mills 306a-306c are depicted, it is understood that other mixing units known in the art, such as rotating blades and nozzles, may be used to generate the final emulsions product stream 314. It should also be noted that although three mixing units 306a-306c are shown, the disclosure is not limited to three mixing units and may include four to six or more mixing units 306.

The filtering units 310a-310b may be microfilters, which may comprise sand, sintered metal, porous rock, or other filtering medium. Such a filter may have an average pore throat size of less than about 20 microns, less than about 10 microns, or less than about 5 microns.

Figure 3C:
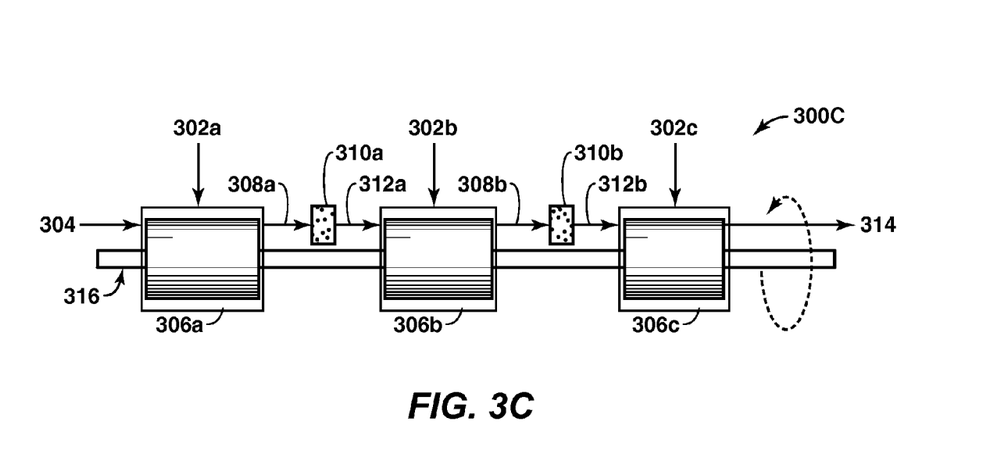

FIG. 3C is another alternative exemplary embodiment of the apparatus 300A. Apparatus 300C is similar to apparatus 300B and to the extent the numerical indicators are the same, the device may be considered to have the same description.

Apparatus 300C includes multiple water stream inlets 302a-302c, indicating that only a portion of the total water injected is injected into each mixer 306a-306c. For example, the first inlet 302a may deliver about 60 vol % of the aqueous fluid, the second inlet 302b may deliver about 30 vol %, and the third inlet 302c may deliver about 10 vol % of the aqueous fluid used to make the emulsion 314.

Figure 3D:
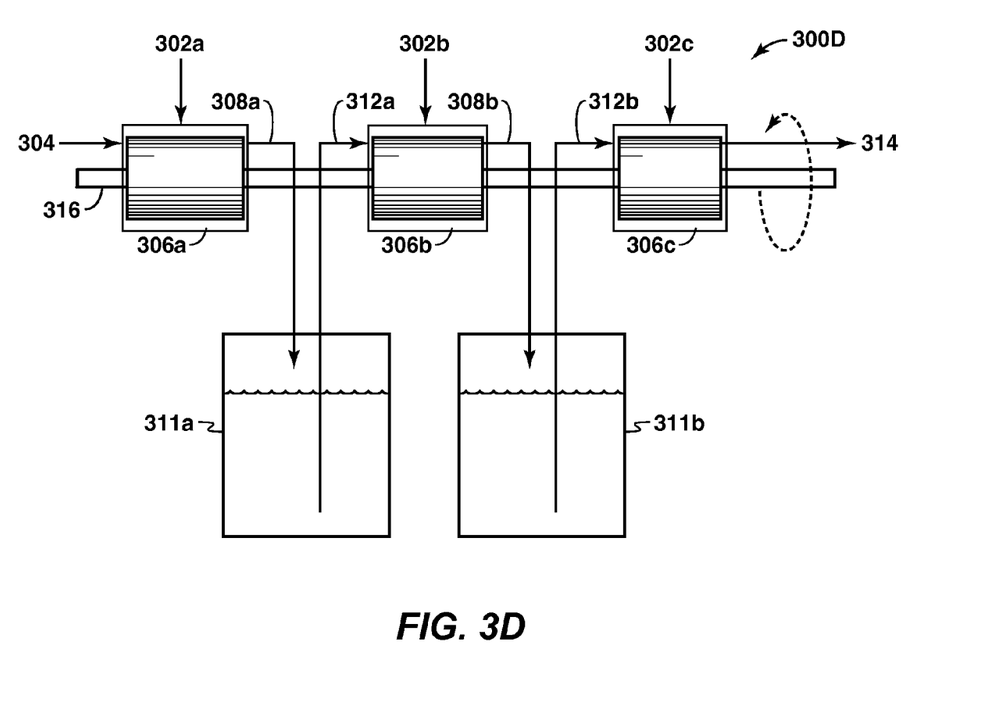

FIG. 3D is an alternative exemplary embodiment of the apparatus 300A. Apparatus 300D is similar to apparatus 300B, but replaces the filters 310a-310b with aging tanks 311a-311b. The tanks 311a-311b are used to stress the emulsion fluid and provide residence time, which may vary from less than three minutes to about thirty minutes to about three hours, depending on the type of emulsion, application, and other operational constraints. Note that although three separate water inlets 302a-302c are shown, the apparatus 300D may include only one water inlet 302 similar to the apparatus 300B.

Figure 3E:
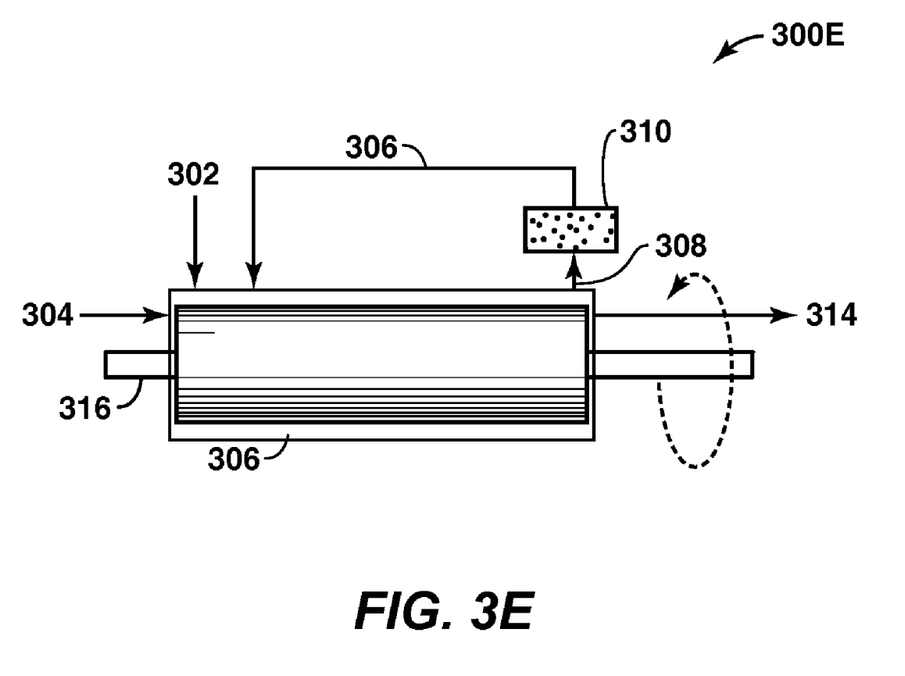

FIG. 3E is an alternative exemplary embodiment of the apparatus 300A. Apparatus 300E includes only one mixing unit 306 and one water inlet 302 and oil inlet 304. Rather than sending the emulsion through three separate mixing units 306a-306c, the stressed fluid stream 313 is recycled back into the mixing unit 306. In this embodiment, the recycled stream 313 is at least a portion of the stressed emulsion that survives the stressing unit 310 and substantially all of the portion of the emulsion that is broken-out of the original emulsion 308. Although a filter 310 is shown, and aging unit such as aging unit 311a or a heating or other stressing unit may be used to stress the emulsion.

One particular application for the basic emulsions 314 generated using the present teachings is using the basic emulsions for displacing moderate to heavy oil (e.g., 20-3,000 cp) from a formation under ambient formation temperature (e.g., 60-200° F. (15-93° C.)) and pressure. An oil-external emulsion applied in such conditions can yield an emulsion with a mobility which is lower than that of the crude oil being displaced. The basic emulsion 314 can then be used as a drive fluid to displace or "push" the hydrocarbons out of the formation. In another embodiment, the basic emulsion 314 may be used as a plugging fluid to block or divert fluid flow in the subterranean formation.

The emulsion droplets are preferably smaller than the pore throats of the rock formation. For example, many formation rocks containing heavy oil deposits have an absolute permeability of from about 2,000 to about 15,000 millidarcies (md), or about 5,000 to about 10,000 md. Such rocks have pore throats with average diameters of from approximately 20-200 microns. As such, droplet sizes in emulsions injected into these rocks are preferably from less than about 1.0 microns to about 15 microns in diameter, or about 5.0 microns to about 10.0 microns in diameter. In at least one embodiment of the present disclosure, it may be preferable to remove solid particles from the emulsion by filtering. Removing the solid particles should result in a smaller droplet size, making the emulsion less likely to clog up the pore throats of a formation. Another approach may be to apply additional shearing energy to further reduce average droplet size when formulating the emulsion.

In some embodiments of the present invention, a diluent may be added to the oil to adjust the emulsion's viscosity. Potential diluents may comprise low viscosity hydrocarbon liquids (e.g., condensate, high API gravity oils, diesel, etc.) or oil-soluble gases (e.g., natural gas, carbon dioxide, methane, ethane, propane, butane, etc.). Typically for large-scale applications, gas addition is more economic than use of liquid hydrocarbons as a diluent.

In another preferred embodiment, the water content of the basic emulsion is high, for example 50 volume percent (vol %) water or higher. At such water contents, the viscosity of the emulsion may be approximately 10-fold to 20-fold higher than the viscosity of the oil used to form the emulsion. If the oil used to form the emulsion has the same viscosity as the oil in the reservoir being displaced by the emulsion flood, the emulsion viscosity will be sufficiently high for efficient flood performance.

To achieve efficient oil displacement in a reservoir flood, the mobility of the emulsion drive fluid preferably should be equal to or less than the mobility of the oil being displaced. As noted above, mobility of the fluid may be defined as the ratio of fluid relative permeability to fluid viscosity. The relative permeability of the oil being displaced or of the emulsion containing a fixed water content will depend on the rock properties such as lithology, pore size distribution, and wettability. These parameters are naturally governed by the fluid-rock system, and cannot normally be adjusted. However, the viscosity of an emulsion can be adjusted to control its mobility by adding diluent or adjusting the volume fraction of the internal phase. An emulsion viscosity that is higher than needed to achieve this mobility ratio will still provide very efficient oil displacement, but will also lead to higher pumping costs and a longer flood life, both of which reduce the economic profitability of the process.

An efficient method for adjusting the viscosity of an oil-external emulsion is to add a gas that is soluble in the oil phase (the continuous or external phase) of the emulsion and reduces its viscosity. Adding hydrocarbon gases such as methane, ethane, propane, butane, or natural gas mixtures can produce reductions in oil viscosity. However, other gases such as carbon dioxide can be especially efficient in reducing oil viscosity at only modest concentrations. The emulsion viscosity therefore can be reduced by incorporating a gas into the emulsion. Generally, a sufficient amount of gas should be added to reduce the emulsion's viscosity to less than about ten times (more preferably, less than about six times) the viscosity of the oil being recovered. This can be achieved by saturating the emulsion with gas at a pressure necessary to achieve the desired equilibrium concentrations in both the oil and water phases of the emulsion.

In the field, the gas can be added to the oil and water prior to blending of the emulsion, or alternately the emulsion can be blended prior to adding the carbon dioxide. Addition of gas to the oil and water prior to blending the emulsion has the added benefit of reducing the viscosity of fluids during blending, thus reducing needed mixing energy. Gas can be added to the fluids using any of a number of mechanical mixing methods known to those skilled in the art. For example, the gas can be injected into the fluid upstream of a high-shear mixing device 206, 306 maintained at a pressure equal to or greater than the gas saturation pressure, or the gas can be mixed into the fluid in a counter-current absorption tower operated at the desired pressure. Regardless of means used for mixing, the pressure within surface facilities needed to incorporate the desired amount of gas will generally be much less than pressures the emulsion will subsequently encounter within injection lines, injection wells, or the oil reservoir. Therefore, the gas will remain dissolved in the emulsion over most or all of its useful lifetime, providing stable viscosity adjustment of the process.

The generated emulsion 214 or 316 should not be primarily stabilized by solid particles native to the constituent fluids. One method to verify the presence of stabilizing solids is to filter the oil and aqueous fluid with a microporous filter (for example 2 micron, 1 micron, or 0.2 micron pore size), thereby removing solids and testing the stability of an emulsion generated from the filtered fluids. If the filtered emulsion has the same stability as the unfiltered emulsion, then the solids can be said to be non-stabilizing solids. U.S. Pat. No. 5,855,243 describes a case where filtering oil with a 0.4 micron pore size filter significantly reduced the stability of emulsions made with the oil thereby substantiating the claim that the solids were a significant stabilizing agent of that emulsion. Stability can be evaluated by passing the emulsion through a porous medium (e.g., filter, sand pack, or porous rock) and measuring how much the aqueous fluid breaks out as a separate phase. Stability analysis using porous rock corefloods are discussed in U.S. Pat. No. 5,855,243 and a centrifuge method using a sand pack is described in the appendix of U.S. Pat. No. 6,734,144.

Experimental Results

Laboratory experiments were performed to test the viability of the disclosed method. In one group of tests, a series of experiments utilizing several viscous oils ranging in viscosity from below 100 centipoise (cp) to above 1,000 cp were examined. The oils constitute a cross-section of oils from the US, Canada, South America, and Africa. The test method used to analyze the emulsion stability is a "micro-percolation test" and is described in the appendix of U.S. Pat. No. 6,734,144. These seven different oils were tested to verify the dependence of emulsion stability on: 1) asphaltene content, 2) sulfur content, and 3) interfacial tension between the hydrocarbon liquid and the aqueous liquid. In particular, the tests utilized emulsions of 40 volume percent (vol %) crude oil and 60 vol % artificial field brine.

Figure 4:
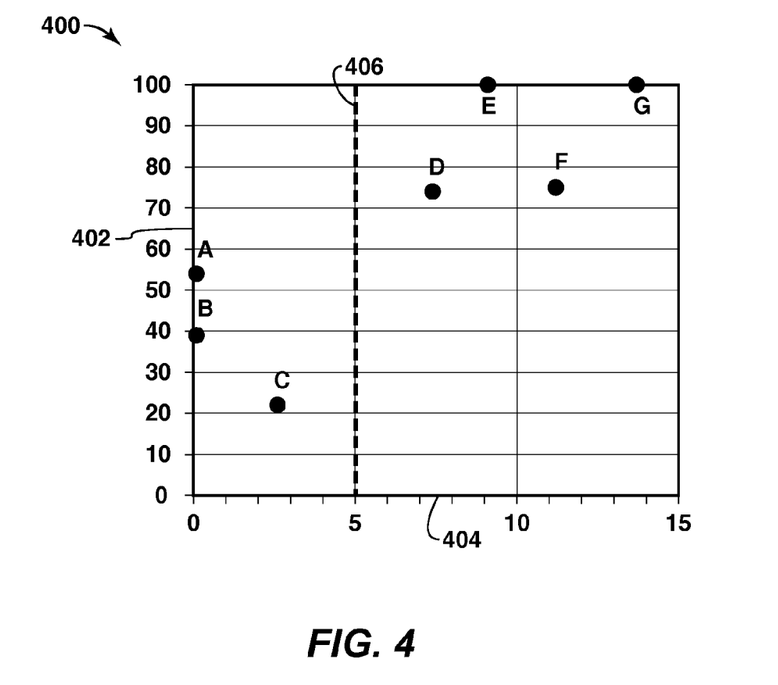
FIG. 4 depicts a graph comparing emulsion stability and hydrocarbon asphaltene content.
Figure 5:
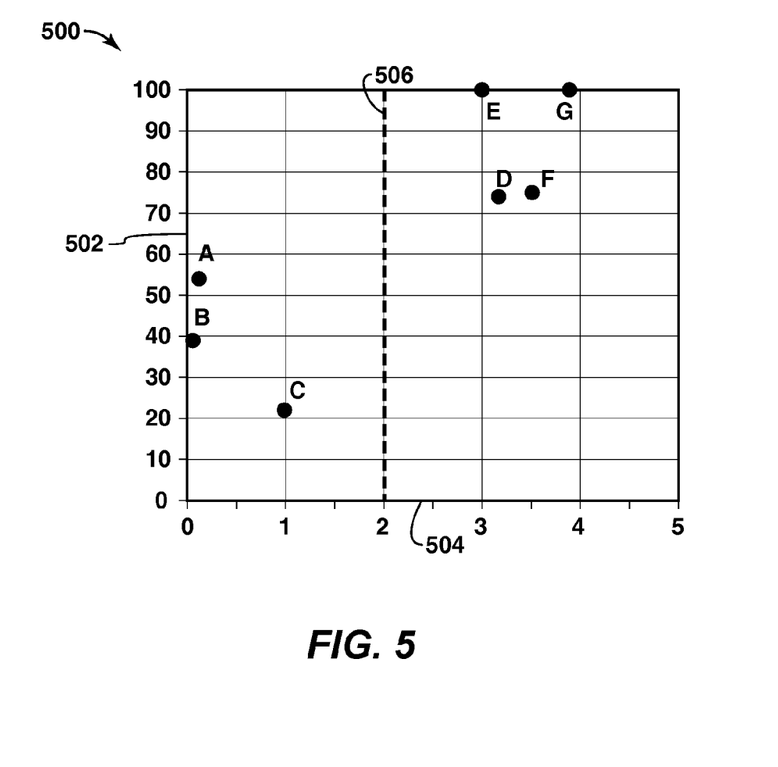
FIG. 5 depicts a graph comparing emulsion stability and hydrocarbon sulfur content.
Figure 6:
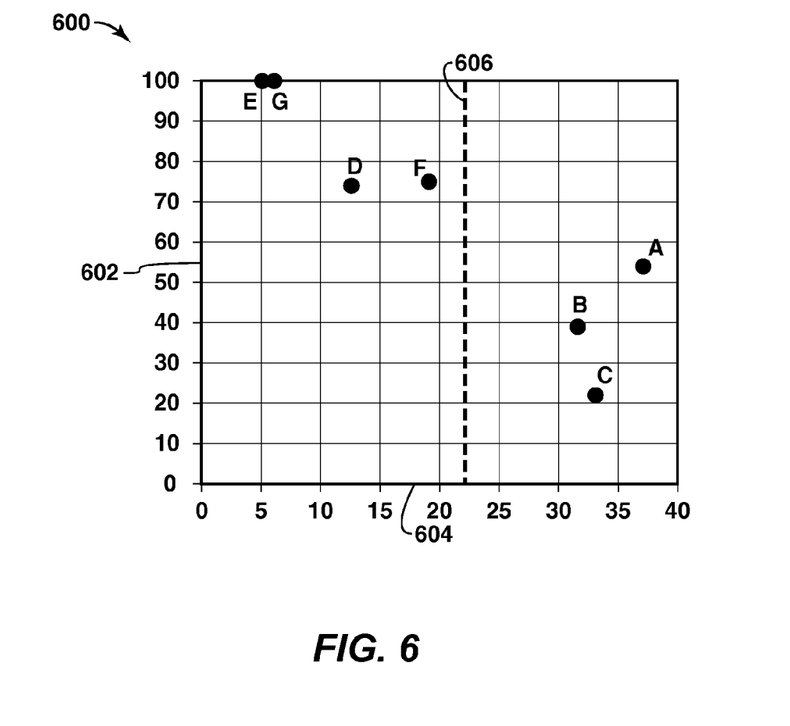
FIG. 6 depicts a graph comparing emulsion stability and interfacial tension between a hydrocarbon liquid and an aqueous liquid.

FIGS. 4-6 are graphs of data gathered using a "micro-percolation" experimental apparatus. FIGS. 4-6 label the data points of the seven oils referred to above using letters A-G. For example, oil "A" in FIG. 4 is the same as oil "A" in FIGS. 5 and 6. FIG. 4 depicts a graph 400 comparing emulsion stability (in percent of brine retained) 402 and hydrocarbon asphaltene content (in weight percent) 404. The line 406 demarcates the point on the graph corresponding to about five wt % asphaltene content. As shown, the oils forming emulsions with the highest stability 402 are all to the right of line 406 (e.g. higher than about five wt % asphaltene content 404). This experimental result supports the limitation that emulsions made with oils having asphaltene contents 404 greater than five percent will remain stable. Note, that the graph may also support a finding that the stability did not decrease for oils having an asphaltene content above about three wt %.

FIG. 5 depicts a graph 500 comparing emulsion stability (in percent of brine retained) 502 and hydrocarbon sulfur content (in weight percent) 504. The line 506 demarcates the point on the graph corresponding to about two wt % sulfur content 504. As shown, the oils forming emulsions with the highest stability 502 are all to the right of line 506 (e.g. higher than about two wt % sulfur content 504). The oils to the right of line 506 are the same oils that were to the right of line 506 in FIG. 4. This experimental result supports the limitation that emulsions made with oils having sulfur contents 504 greater than five percent will remain stable. Note, that the graph may also support a finding that the stability did not decrease for oils having a sulfur content above about one wt %.

FIG. 6 depicts a graph 600 comparing stability (in percent of brine retained) 602 and oil-brine interfacial tension (in dyne/cm) 604. The line 606 demarcates the point on the graph corresponding to about 22 dyne/cm interfacial tension. As shown, the oils forming emulsions with the highest stability 602 are all to the left of line 606 (e.g. less than about 22 wt % dyne/cm interfacial tension 604). The oils to the left of line 606 are the same oils that were to the right of line 406 in FIGS. 4 and 506 in FIG. 5. This experimental result supports the present disclosure that emulsions made with oils having interfacial tension 604 less than 22 dyne/cm will remain stable. These results further support the disclosure that asphaltene content, sulfur content, and interfacial tension are correlative with emulsion stability. Note, that the graph may also support a finding that the stability did not decrease for oils having an interfacial tension below about 20 dyne/cm.

The experimental results illustrated in FIGS. 4-6 support the present disclosure that oil having certain properties forms more stable emulsions than oil not having these properties. For example, oils D-G all have greater than five wt % asphaltenes, 2 wt % sulfur, and less than 22 dyne/cm interfacial tension with an aqueous phase and all form significantly more stable emulsions than oils A-C, which do not have any of the disclosed properties in the taught ranges.

The experimental results further show that to select oils for forming "super-stable" emulsions (e.g., oils E and G), one may limit the parameters to: i) an asphaltene content above about eight wt %, and ii) an interfacial tension below about 10 dyne/cm.

Figure 7:
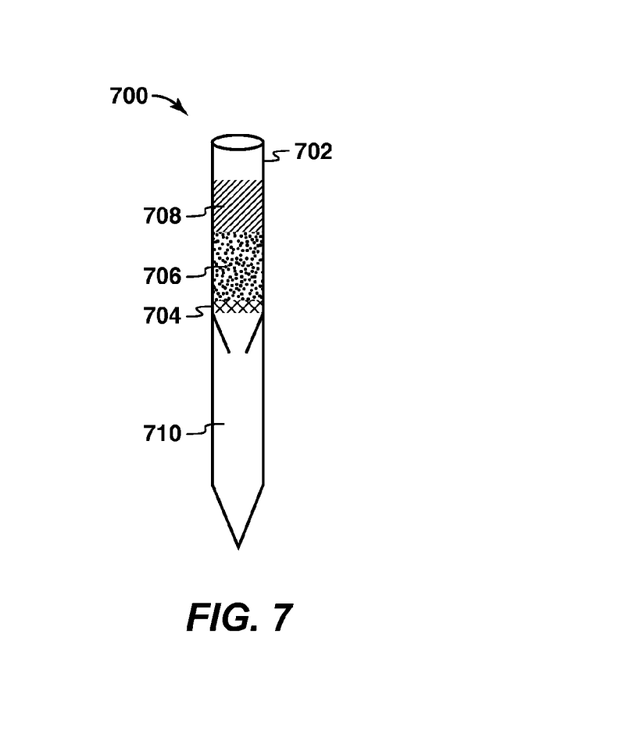
FIG. 7 is an exemplary schematic of the setup of the centrifuge tubes as used in a micro-percolation test.

A second set of experiments was conducted to show that for certain hydrocarbon liquids, the stability of the liquid is not affected by the presence of solids. The tests were conducted in a manner conceptually similar to the "micro-percolation" method but a larger fluid sample was used. In particular, FIG. 7 is an exemplary schematic of the setup of the centrifuge tubes as used. In the setup 700, a 15 milliliter (ml) transparent plastic tube 702 was used. The tube 702 includes a highly porous plug 704 set in the taper of the tube 702. Sand 706 was then placed on top of the plug 704. Emulsion 708 was placed on the sand 706. Once the setup was complete, the emulsion 708 was tested by spinning the tube 702 in a centrifuge (not shown) to push the emulsion 708 through the sand 706 and the plug 704 into the fluid collection portion 710 of the tube 702.

The tests were run at room temperature. The centrifuge ran at about 2,600 revolutions per minute (rpm) inducing a centrifugal force of about 900 times the acceleration due to gravity. The centrifuge tests included passing about 4 cubic centimeters ($cm^3$) of unpressurized water-in-oil emulsion through about 4 cm of packed sand. The sand pack typically had a permeability of about 4 Darcy with 35-40% porosity.

Tests verified that the porous plug 704 had no measurable effect on the emulsion 708. Any water that broke out of the emulsion 708 collected in the bottom of the taper 710, being denser than the oil used. The amount of water was read off visually. Tests were run until the amount of water collected was stable, typically 2 to 4 hours. The greater the amount of water separated from the emulsion 708 as it passed through the porous medium, the less stable the emulsion thus indicating reduced effectiveness as a displacement agent for recovering viscous oil from a reservoir.

Decane was used to reduce the emulsion viscosity to about twice that of the undiluted oil. The emulsions were made using a benchtop Silverson™ mixer running at high speed. Brine was added slowly to the mixer over the course of about 10 minutes to generate the emulsion.

Figure 8:
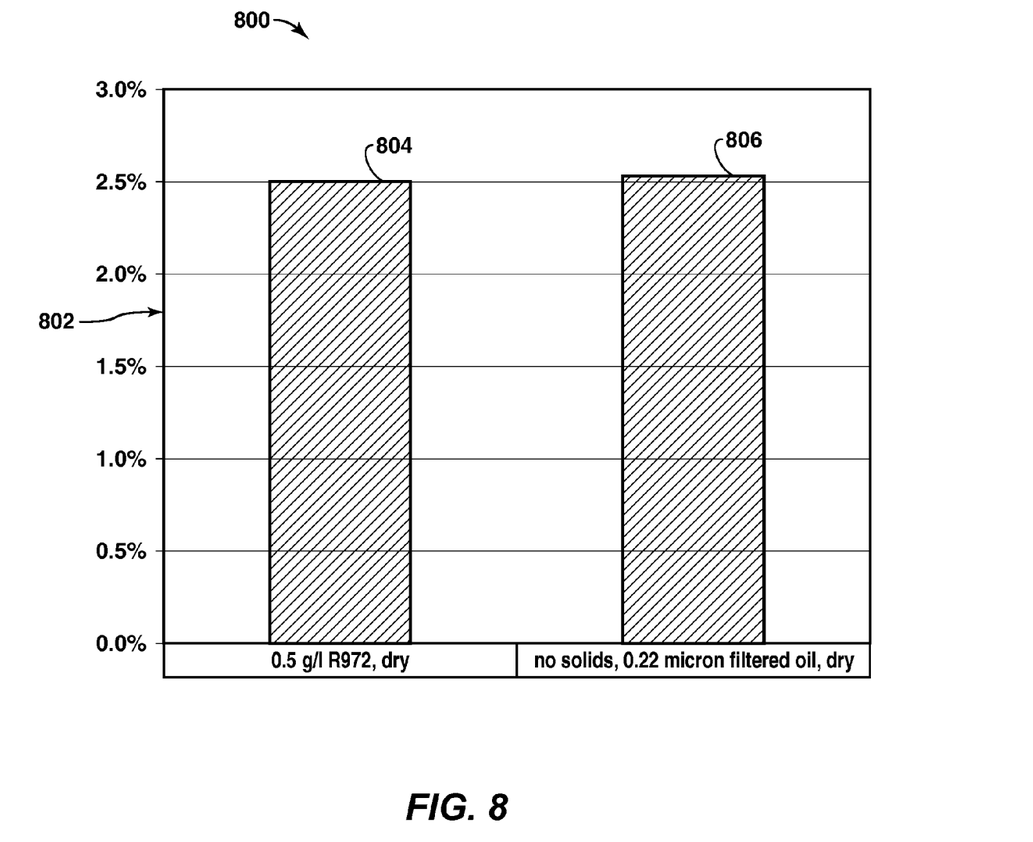
FIG. 8 is an illustration of a bar graph comparing the stability of two water-in-oil emulsions.

FIG. 8 is an illustration of a bar graph 800 comparing the stability in terms of resolved ("broken-out") water fraction 802 of two water-in-oil emulsions 804 and 806. Stability of the emulsions 804 and 806 can be best understood with reference to the test described in relation to FIG. 7. A sand (706) of approximately 4 Darcy permeability was used in the test. The sand was dry prior to adding the emulsion (708). Emulsions 804 and 806 are heavy Canadian oil emulsions composed of about 32 vol % crude oil, 8 vol % decane, and about 60 vol % brine. Emulsion 804 has about 0.5 grams per liter of oil-wetting Aerosil™ R972 fumed silica from Evonik Degussa added. Liquid 806 has no solids added and its constituent fluids were filtered through a 0.22 micron filter prior to generating the emulsion. In comparing emulsions 804 and 806, it is shown that the stability (in resolved water fraction) 802 is identical, even without any added solids and pre-filtering the constituent fluids through the 0.22 micron filter. As such, this exemplary experimental result supports the present disclosure that basic emulsions may have the same stability as emulsions with solids.

While the present invention may be susceptible to various modifications and alternative forms, the exemplary embodiments discussed above have been shown only by way of example. However, it should again be understood that the invention is not intended to be limited to the particular embodiments disclosed herein. Indeed, the present invention includes all alternatives, modifications, and equivalents falling within the true spirit and scope of the appended claims.

What is claimed is:

1. A method for producing viscous hydrocarbons from a subterranean formation, comprising:
   a. selecting a hydrocarbon liquid and an aqueous liquid for generating an emulsion, wherein the hydrocarbon liquid has at least one of the following properties: (i) greater than about five weight percent (wt %) asphaltene content, (ii) greater than about two wt % sulfur content, and (iii) less than about 22 dyne/cm interfacial tension between the hydrocarbon liquid and the aqueous liquid;
   b. generating the emulsion having a continuous phase formed from the hydrocarbon liquid and an internal phase formed from the aqueous liquid, wherein the emulsion is a basic emulsion and the emulsion retains at least 70% of the aqueous liquid when the emulsion is used as a drive fluid, wherein a basic emulsion is substantially free from stabilizing solids and substantially free of any added stabilizing agent or component such as those found in artificially stabilized emulsions;
   c. injecting the basic emulsion into the subterranean formation for use as a drive fluid; and
   d. producing said viscous hydrocarbons from the formation using the basic emulsion.

2. The method of claim 1, wherein the hydrocarbon liquid has at least two of the following properties: (i) greater than about five weight percent (wt %) asphaltene content, (ii) greater than about two wt % sulfur content, and (iii) less than about 22 dyne/cm interfacial tension between the hydrocarbon liquid and the aqueous liquid.

3. The method of claim 2, wherein the hydrocarbon liquid has all three of the following properties: (i) greater than about five weight percent (wt %) asphaltene content, (ii) greater than about two wt % sulfur content, and (iii) less than about 22 dyne/cm interfacial tension between the hydrocarbon liquid and the aqueous liquid.

4. The method of claim 2, wherein the hydrocarbon liquid has each of the following properties: (i) greater than about eight weight percent (wt %) asphaltene content, and (ii) less than about 10 dyne/cm interfacial tension between the hydrocarbon liquid and the aqueous liquid.

5. The method of claim 1, wherein the hydrocarbon liquid is the viscous hydrocarbons produced from the formation.

6. The method of claim 5, wherein the aqueous liquid is in the form of droplets, wherein about 90 percent of the droplets have diameters of less than 20 microns and wherein less than 50 volume percent (vol %) of the basic emulsion comprises the hydrocarbon liquid and greater than 50 vol % of the basic emulsion comprises the aqueous liquid.

7. The method of claim 5, further comprising diluting the hydrocarbon liquid with a soluble diluent to obtain an emulsion with a specified viscosity.

8. The method of claim 7, wherein the soluble diluent is a gas selected from the group consisting of: methane, ethane, propane, carbon dioxide, and any combination thereof.

9. The method of claim 5, wherein the aqueous phase comprises brine.

10. The method of claim 9, wherein the aqueous phase has a salt concentration greater than about 1 weight percent (wt %).

11. The method of claim 5, wherein the emulsion is generated in a staged continuous throughput mixer where less than about 60 volume percent (vol %) of the total aqueous liquid is added in any one stage.

12. The method of claim 5, wherein the emulsion is generated in a staged continuous throughput mixer where less than about 40 vol % of the total aqueous liquid is added in any one stage.

13. The method of claim 5, wherein the hydrocarbon liquid has a viscosity of greater than 20 centipoise (cp) at about 68 degrees Fahrenheit, 1 atmosphere, and 1 inverse second shear rate.

14. The method of claim 5, wherein the hydrocarbon liquid has a viscosity of greater than 100 centipoise (cp) at about 68 degrees Fahrenheit, 1 atmosphere, and 1 inverse second shear rate.

15. The method of claim 5, wherein the hydrocarbon liquid contains solids, further comprising removing at least a portion of the solids from the hydrocarbon liquid prior to generating the basic emulsion.

16. A method of generating an emulsion, comprising:
   selecting a hydrocarbon liquid and an aqueous liquid, wherein the hydrocarbon liquid has at least one of the following properties: (i) greater than about five weight percent (wt %) asphaltene content, (ii) greater than about two wt % sulfur content, and (iii) less than about 22 dyne/cm interfacial tension between the hydrocarbon liquid and the aqueous liquid;
   forming a basic emulsion from the hydrocarbon liquid and the aqueous liquid, wherein the hydrocarbon liquid is the continuous phase component of the basic emulsion and the aqueous liquid is the internal phase component, wherein a basic emulsion is substantially free from stabilizing solids and substantially free of any added stabilizing agent or component such as those found in artificially stabilized emulsions; and
   improving the stability of the basic emulsion wherein the basic emulsion retains at least 70% of the aqueous liquid when the emulsion is used as a drive fluid, comprising:
      stressing the basic emulsion to rupture at least a portion of the internal phase component to produce a stressed emulsion and a broken-out portion of the internal phase component; and
      shearing the stressed emulsion with at least a portion of the broken-out portion of the internal phase component.

17. The method of claim 16, wherein the hydrocarbon liquid has at least two of the following properties: (i) greater than about five weight percent (wt %) asphaltene content, (ii) greater than about two wt % sulfur content, and (iii) less than about 22 dyne/cm interfacial tension between the hydrocarbon liquid and the aqueous liquid.

18. The method of claim 17, wherein the hydrocarbon liquid has all three of the following properties: (i) greater than about five weight percent (wt %) asphaltene content, (ii) greater than about two wt % sulfur content, and (iii) less than about 22 dyne/cm interfacial tension between the hydrocarbon liquid and the aqueous liquid.

19. The method of claim 16, wherein the aqueous liquid is in the form of droplets, wherein about 90 percent of the droplets have diameters of less than about 20 microns and wherein less than 50 volume percent (vol %) of the basic emulsion comprises the hydrocarbon liquid and greater than 50 vol % of the basic emulsion comprises the aqueous liquid.

20. The method of claim 19, wherein the stressing step comprises passing the emulsion through a microfilter, aging the emulsion, heating the emulsion, applying an electric field to the emulsion, or any combination thereof.

21. The method of claim 20, wherein the microfilter comprises sintered metal, natural porous rock, or unconsolidated granular material.

22. The method of claim 20, wherein the microfilter has an average pore throat size of less than about 7 microns.

23. The method of claim 20, wherein the emulsion is aged for at least about 3 minutes to at least about 30 minutes.

24. The method of claim 16, wherein the step of improving the stability of the emulsion by stressing and reshearing the emulsion is repeated at least once.

25. The method of claim 24, further comprising adding water during the at least one repetition.

26. The method of claim 16, wherein the emulsion is used as a plugging fluid to block or divert fluid flow in the subterranean formation.

27. The method of claim 16, further comprising heating the emulsion prior to or during the stressing step.

28. The method of claim 16, further comprising adding a diluent to the oil portion of the emulsion.

29. A method of generating viscous hydrocarbons from a subterranean formation, comprising:
  generating a basic emulsion in accordance with the method of claim 16;
  injecting the basic emulsion into the subterranean formation for use as a drive fluid; and
  producing the viscous hydrocarbons from the formation using the basic emulsion.

* * * * *